March 21, 1950     C. OMAN     2,501,351
IMPULSE RECEIVER FOR METERING SYSTEMS
Filed May 1, 1945
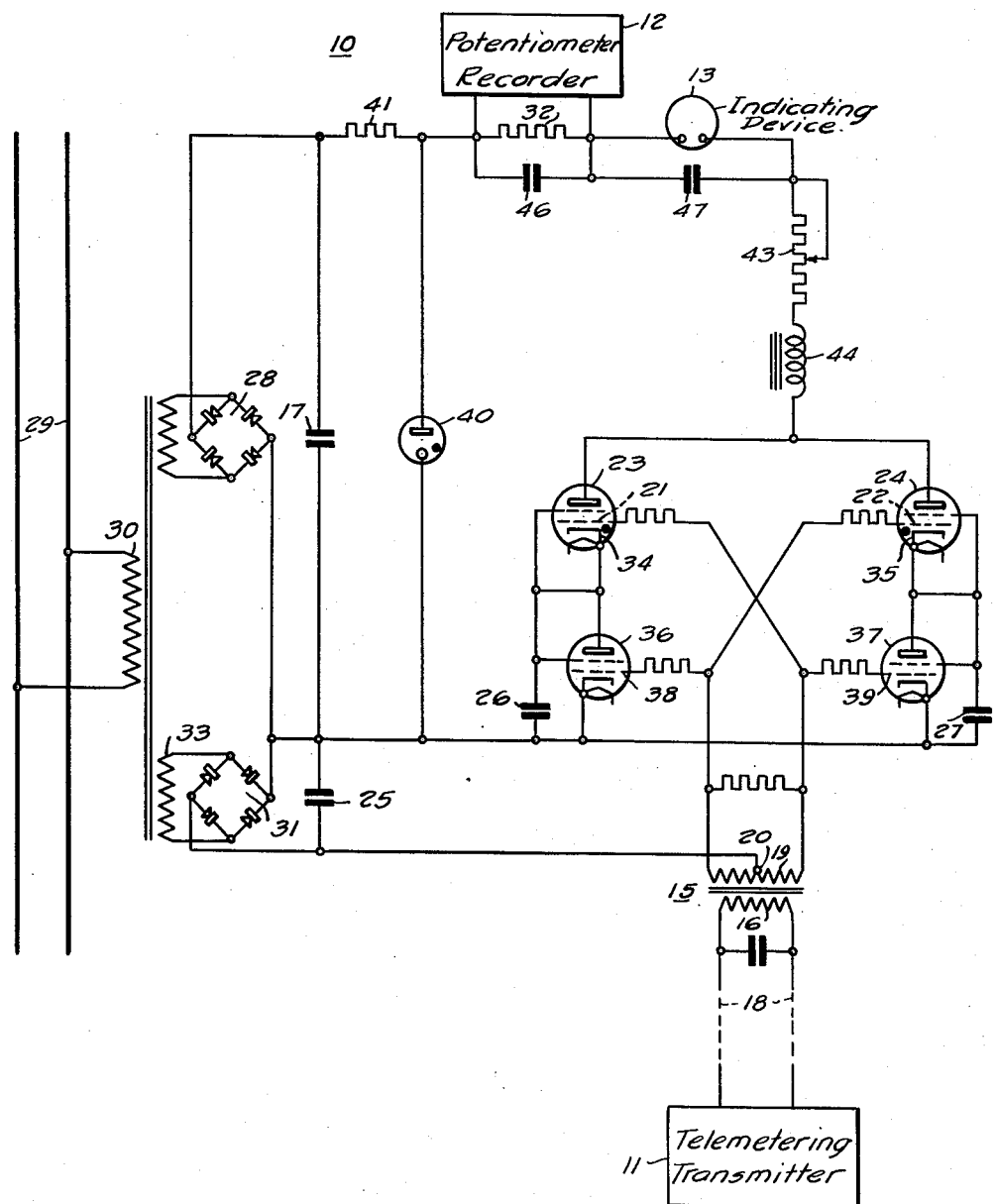
WITNESSES:
INVENTOR
Carl Oman.
BY
ATTORNEY Patented Mar. 21, 1950

2,501,351

UNITED STATES PATENT OFFICE 2,501,351

IMPULSE RECEIVER FOR METERING SYSTEMS

Carl Oman, Cedar Grove, N. J., assignor to Westinghouse Electric Corporation, East Pittsburgh, Pa., a corporation of Pennsylvania Application May 1, 1945, Serial No. 591,298

4 Claims. (Cl. 175—368)

My invention relates, generally, to metering systems and has reference, in particular, to impulse receivers for telemetering systems.

Generally stated, it is an object of my invention to provide a telemetering impulse receiver which is simple and inexpensive to manufacture and is easy to operate.

More specifically, it is an object of my invention to provide for converting telemetering impulses occurring at rates dependent upon the value of a quantity which is to be measured, into an electrical quantity which is dependent only upon the rate or frequency of the impulses.

Another object of my invention is to provide a high-speed impulse converter for telemetering systems which is independent of variations in the peak values of the impulses.

Yet another object of my invention is to provide an impulse receiver which operates on direct current impulses as well as on alternating-current impulses.

It is also an object of my invention to provide for calibrating an impulse receiver by varying the impedance of a condenser charging circuit in the receiver.

Other objects will in part be obvious, and will in part be explained hereinafter.

In practicing my invention, incoming telemetering impulses are applied to the primary winding of an input transformer to produce alternating-current impulses in the secondary winding, which are applied alternately to the control electrodes of arc discharge devices controlling the charging and discharging of a condenser. Metering means is provided in the charging circuit of the condenser, and since the average current is proportional to the impulse rate or frequency, an indication of the value of the quantity being measured at a remote station is obtained. A resistor in conjunction with a choke coil in the charging circuit of the condenser provides for varying the charging voltage of the condenser, and hence the average charging current, so that the receiver may be readily calibrated.

For a more complete understanding of the nature and scope of my invention, reference may be made to the accompanying drawing, in which the single figure is a diagrammatic view of a telemetering impulse receiver embodying the invention in one of its forms.

Referring to the single figure of the drawing, the reference numeral 10 may denote, generally, an electronic impulse receiver or converter for use in translating the impulses produced by a remote telemetering transmitter 11, so as to produce an indication on indicating means, such as the potentiometer recorder 12 and indicating device 13, of the value of a quantity which is being measured at the remote station.

The impulse receiver may comprise an input transformer 15 having a primary winding 16 connected to the telemetering channel 18, and a secondary winding 19 having a center tap 20. The secondary winding 19 may be utilized for controlling the potential of the control electrodes 21 and 22 of electric discharge valves 23 and 24. In order to make the receiver responsive to the frequency of the incoming impulses only, and not to their peak values, the valves may be of the gas-filled type. The arc discharge valves 23 and 24 may be connected in series circuit relation with energy storage means such as the converter condensers 26 and 27, respectively. The condensers may be connected in parallel circuit relation with each other and in series circuit relation with the indicating device 13, and a source of direct current such as the rectifier bridge circuit 28, which may be connected to an alternating-current source represented by the conductors 29, by means of a transformer 30. A filter condenser 17 may be connected across the bridge circuit 28. The potentiometer recorder 12 may be connected across a resistor 32, which is connected in series circuit relation with the parallel circuit of the condensers 26 and 27 and the rectifier bridge circuit 28.

The control electrodes 21 and 22 of the valves may be connected to opposite terminals of the secondary winding 19 so that the valves may be rendered conductive in alternate half-cycles of the alternating-current potential produced in the secondary winding to charge the condensers 26 and 27 to predetermined fixed values, regardless of whether the impulses transmitted over the channel 18 are direct current or alternating current and regardless of the peak values of the impulses. Means such as the rectifier bridge circuit 31 energized from a winding 33 of the transformer 30 may be provided in connection with the center tap 20 and the cathodes 34 and 35 of the arc discharge devices 23 and 24, respectively, for normally maintaining the control electrodes 21 and 22 at a negative bias to prevent conductivity of the arc discharge devices. A filter condenser 25 may be connected across the bridge circuit 31.

In order to render the recorder 12 and indicating device 13 responsive only to the frequency of the impulses transmitted over the channel 18, it is desirable to have the condensers 26 and 27 in a discharged condition each time they are charged in response to impulses for the transmitter. Accordingly, means such as the arc discharge devices 36 and 37 may be connected in shunt circuit relation with the converter condensers 26 and 27, respectively, for discharging these condensers each time they are charged, independently of the charging circuit. This result may be obtained by connecting the control electrodes 38 and 39 of the discharge devices 36 and 37 to opposite terminals of the secondary winding 19, both as regards each other and as regards control electrodes 21 and 22 of the arc discharge devices 23 and 24.

In order to insure the converter condensers 26 and 27 being charged to a predetermined value, regulating means such as the neon glow valve 40 may be connected across the terminals of the rectifier bridge circuit 28 in conjunction with a control resistor 41 for maintaining a substantially constant terminal voltage for charging the converter condensers. Since the arc discharge devices 23 and 24 conduct in one direction only, the charges on the condensers 26 and 27 will be dependent upon the peak values of the charging voltages, which, due to inductance in the circuit, will tend to be oscillatory in nature. Accordingly, means such as the calibrating resistor 43 may be provided in series circuit relation with the source 28 and the condensers in conjunction with a choke coil 44 for varying the peak voltage during charging, and hence the charges on the condensers.

In operation, regardless of whether direct or alternating-current impulses are received over the telemetering channel 18, an alternating-current potential is produced across the secondary winding 19 of the input transformer 15. Accordingly, the arc discharge devices 23 and 37 will be rendered conductive on one half-cycle, while the arc discharge devices 36 and 24 are rendered conductive on the succeeding half-cycle. On the first half-cycle, the condenser 26 is charged through the arc discharge device 23. Since the arc discharge device 23 is of the gas-filled type, the peak value or duration of the impulse is immaterial, and the device 23 continues to conduct until the condenser 26 is charged to a predetermined value as determined by the source voltage and characteristics of the charging circuit. Since the charging circuit has both capacity and inductance, it is inherently oscillatory, and the voltage across the condenser 26 may reach peak values in excess of the source voltage, so long as the resistance in the circuit is less than $$2\sqrt{\frac{L}{C}}$$

Since the charge at any instant is proportional to the voltage across the condenser, the charge may be varied by adjusting the control resistor 43, which determines the peak voltage of the charging circuit. Oscillations in the condenser voltage are actually prevented by the valve which prevents current reversal.

In the same half-cycle that the arc discharge device 23 is rendered conductive, the arc discharge device 37 is rendered conductive to discharge the condenser 27. In the following half-cycle, the arc discharge device 24 is rendered conductive to charge the condenser 27, while the arc discharge device 36 is rendered conductive to discharge the condenser 26 independently of its charging circuit. Accordingly, the potentiometer recorder 12 and the indicating device 13 are subjected to the flow of an average current, which is dependent only on the charging current of the converter condensers 26 and 27 and hence the frequency of the incoming impulses, since the discharging circuits therefor are independent and separate from the charging circuits. By connecting damping condensers 46 and 47 across the recorder 12 and meter 13, these instruments may be subjected to the flow of a substantially steady average current, which is directly proportional to the rate or frequency of the impulses received over the telemetering channel 18. Since the arc discharge devices 23 and 24 are of the gas-filled type they continue to conduct during the half cycles in which they are rendered conductive until the condensers 26 and 27 acquire predetermined charges, regardless of the peak value or duration of the individual impulses. The recorder and meter accordingly give true indications of the value of the quantity which is being metered at the remote station.

From the above description and accompanying drawing, it will be apparent that I have provided an impulse receiver which is simple and inexpensive to manufacture and is reliable in operation. While this receiver may be used with many types of transmitters, it is particularly adapted for use with a transmitter of the type described and claimed in my copending application Serial No. 591,297, now Patent No. 2,451,971, issued October 19, 1948. With such a transmitter a highly responsive telemetering system is provided, having a response time on the order of one second, which is of great advantage in load control, etc. Since there are no moving parts, the receiver is capable of operation at a relatively high rate with a high degree of accuracy. The rate of response is about five times faster than that of the usual make and break contact scheme. The overall time of response is about one second. The nominal operating range of such a receiver easily accommodates a frequency range of 500 to 2500 impulses per minute. Since only standard valve devices are used in the receiving circuit, it is easily serviced and inexpensive to operate.

Since certain changes may be made in the above-described construction and different embodiments of the invention may be made without departing from the spirit and scope thereof, it is intended that all the matter contained in the above description and shown in the accompanying drawing be considered as illustrative and not in a limiting sense.

I claim as my invention:

1. An impulse converter for impulse telemetering systems comprising, a pair of condensers connected in parallel circuit relation, means including a gas-filled arc discharge device connected in circuit relation with each condenser for connecting it to a source of direct current, an electric discharge device connected in shunt relation with each condenser for discharging it independently of the other, metering means responsive only to the charging currents of the condensers, and means including an input transformer having a primary winding for receiving telemetering impulses and a secondary winding connected for rendering the gas-filled arc discharge device and the discharge device of each condenser conductive alternately, the devices of the one condenser being rendered conductive in out-of-phase relation.

2. In an impulse converter, a pair of condensers connected in parallel circuit relation, a gas-filled discharge valve connected in series circuit relation with each of the condensers for connecting them to a source of direct current, each of said valves having a control electrode for rendering the valve conductive, metering means responsive to charging of the condensers, circuit means regulating the voltage of the source, control means including an additional discharge valve connected in shunt relation with each condenser and having a control electrode, an input transformer having a primary winding disposed to be energized by periodic impulses of electrical energy and a secondary winding, circuit means connecting the control electrodes of the gas-filled valve and the shunt connected discharge valve of one condenser to opposite ends of the secondary winding, and circuit means connecting the control electrodes of the valves of the other condenser in inverse relation to the control electrodes of the valves of said one condenser.

3. An impulse receiver for use in converting telemetering impulses comprising, an energy storage device, means including a gas-filled arc discharge device providing a circuit for charging the energy storage device to capacity in response to an incoming impulse, valve means providing a discharge circuit for the energy storage device independently of the charging circuit each time it is charged, metering means connected in the charging circuit of the energy storage device responsive to the flow of charging current, circuit means connected to render the arc discharge device and the valve means conductive sequentially in response to an incoming impulse, and circuit means including an adjustable resistance and inductance means connected directly in series with said metering means, series discharge device and said energy storage device to provide an oscillatory charging circuit for the energy storage device and provide for varying the effective charging voltage of the energy storage device.

4. In an impulse converter for use in impulse telemetering, a pair of condensers, circuit means associated with each condenser including a gas-filled arc discharge device with a control electrode, each said arc discharge device being connected in series circuit relation with the associated condenser for charging it from a source of direct current, additional circuit means associated with each condenser including an electric discharge device with a control electrode connected in shunt relation with said condenser for discharging it, meter means responsive only to the charging current of the condensers and control means including an input transformer having a secondary winding with the respective opposite terminals thereof connected one to the control electrode of the series connected arc discharge device and the other to the control electrode of the shunt connected arc discharge of one of the condensers to alternately apply positive and negative impulses to the control electrodes of the series and shunt connected arc discharge devices in predetermined out-of-phase relation in response to successive telemetering impulses for alternately rendering the discharge devices conductive, said respective input transformer terminals also being connected similarly but in opposed phase relation to the respective control electrodes of the discharge devices of the other condenser to simultaneously apply impulses of the opposite polarity to the control electrodes of the corresponding arc discharge devices of the other condenser in opposed phase relation.

CARL OMAN.

REFERENCES CITED

The following references are of record in the file of this patent:

UNITED STATES PATENTS

| Number | Name | Date |
|---|---|---|
| 2,026,421 | Fecker | Dec. 31, 1935 |
| 2,110,015 | Fitzgerald | Mar. 1, 1938 |
| 2,119,389 | Hunt | May 31, 1938 |
| 2,144,215 | Beverage | Jan. 19, 1939 |
| 2,259,070 | Knochmann | Oct. 14, 1941 |
| 2,265,717 | Bedford | Dec. 9, 1941 |
| 2,281,710 | Oman | May 5, 1942 |

FOREIGN PATENTS

| Number | Country | Date |
|---|---|---|
| 118,779 | Australia | Aug. 7, 1944 |